United States Patent [19]

Huber

[11] Patent Number: 5,033,601
[45] Date of Patent: Jul. 23, 1991

[54] CONVEYOR BALL UNIT

[75] Inventor: Thomas Huber, Iffeldorf, Fed. Rep. of Germany

[73] Assignee: Bavaria Cargo Technologie GmbH, Fed. Rep. of Germany

[21] Appl. No.: 508,440

[22] Filed: Apr. 13, 1990

[30] Foreign Application Priority Data

Aug. 21, 1989 [DE] Fed. Rep. of Germany ....... 3927560

[51] Int. Cl.$^5$ .............................................. B65G 13/00
[52] U.S. Cl. ............................. 193/35 MD; 244/137.1
[58] Field of Search ........... 193/35 MD, 35 SS, 35 B; 16/23, 24, 25, 26, 27; 384/49, 490, 491, 610; 244/137.1

[56] References Cited

U.S. PATENT DOCUMENTS

| 3,739,894 | 6/1973 | Hinman | 16/26 X |
| 4,689,847 | 9/1987 | Huber . | |
| 4,696,583 | 9/1987 | Gorges . | |
| 4,778,041 | 10/1988 | Blaurock . | |
| 4,832,185 | 5/1989 | Huber . | |
| 4,871,052 | 10/1989 | Huber . | |

FOREIGN PATENT DOCUMENTS 1297185  5/1962  France ........................ 193/35 MD Primary Examiner—Joseph E. Valenza
Assistant Examiner—Tuan N. Nguyen
Attorney, Agent, or Firm—Sughrue, Mion, Zinn Macpeak & Seas

[57] ABSTRACT

A conveyor ball unit for installation in a mounting opening in a conveyor track panel. A conveyor ball is rotatably mounted on a plurality of mounting balls in a mounting shell and projects upwardly out of the conveyor ball unit. A ball guide of annular configuration embraces the conveyor ball from above to secure the conveyor ball and the mounting balls in the mounting shell. At its peripheral edge the ball guide has at least two locking elements each of which, in the assembled condition of the unit, securingly engages by means of a locking shoulder under a peripheral flange on the mounting shell, to hold the mounting shell and the ball guide together. When the conveyor ball unit is in the installed condition in a conveyor track panel, the peripheral flange of the mounting shell is supported against the peripheral edge of the mounting opening in the conveyor track panel, and the locking shoulders of the locking elements securingly engage with their free outer ends under the peripheral edge of the mounting opening.

6 Claims, 3 Drawing Sheets

CONVEYOR BALL UNIT

BACKGROUND OF THE INVENTION

One form of a conveyor ball unit for installation in a mounting opening in a conveyor track panel comprises a conveyor ball which is rotatably mounted on a plurality of mounting balls in a mounting shell and which projects upwardly out of the conveyor ball unit, with a ball guide or retainer embracing the conveyor ball from above in an annular configuration to secure the conveyor ball and the mounting balls in the mounting shell. At its peripheral edge the ball guide is provided with at least two locking elements each of which has a locking shoulder which in the assembled condition of the unit securingly engages under a peripheral flange on the mounting shell, thereby to hold the shell and ball guide together.

Conveyor ball units of that kind are used for example in ball-type conveyor tracks which are provided for example in the freight compartment of a freight aircraft, for moving freight containers when loading or unloading the aircraft. Under those conditions of use the conveyor ball units are subject in particular to the requirements that they should be maintenance-free and very robust, while nonetheless being low in weight.

In a particular configuration of a conveyor ball unit as generally discussed above, to be found in U.S. Pat. No. 4,871,052, the conveyor ball which is rotatably mounted on a plurality of mounting balls is combined together with a substantially hemispherical mounting shell and a ball guide which is connected thereto and which holds the conveyor ball on the mounting balls, to provide a mounting assembly. The mounting assembly is disposed in a substantially hollow-cylindrical housing movably along the centre line of the housing. The housing itself is then releasably fixed to the panel of a conveyor track. Arranged between the underside of the mounting shell and ribs in the lower portion of the housing is an array of plate springs for biasing the mounting unit, in the unloaded condition of the conveyor ball, upwardly in the housing until meeting an abutment shoulder, so that the conveyor ball projects upwardly through a central opening in the ball guide and beyond the surface of the panel of the conveyor track. When subjected to a loading by a freight container, the conveyor ball together with the entire mounting assembly can be urged resiliently downwardly into the housing against the force of the plate springs, until the spring travel of the array of plate springs has been totally utilised.

Although, generally speaking, the resilient configuration of the conveyor ball unit is highly desirable because of the severe requiremens occuring in a freight loading situation, nonetheless in practice there are some situations of use in which it is impossible to forego the resilient action of the unit and instead the predominant consideration is that the conveyor ball unit should be of a minimum weight.

SUMMARY OF THE INVENTION

An object of this invention is to provide a conveyor ball unit which is distinguished by being of a simple robust structure and low weight.

Another object of this invention is a conveyor ball unit for a conveyor track, which involves a small number of components affording a high level of reliability and easy of assembly of the unit and installation thereof in a conveyor.

These and other objects are attained by a conveyor ball unit in accordance with the principles of this invention.

The configuration of the unit according to the invention provides that the mounting shell which is generally made from metal is itself supported on the conveyor track panel directly and without further assembly or housing portions. In particular the conveyor ball unit according to the invention is distinguished in that the locking elements on the ball guide means perform a dual function: on the one hand, the locking shoulders serve to hold the mounting shell, the mounting balls, the conveyor ball and the ball guide means together, while on the other hand they also perform the function of holding the conveyor ball unit, which is held together in that way, firmly in the mounting opening in the conveyor track panel as, in the installed condition, the locking shoulders also engage under the edge of the mounting opening in the conveyor track panel and thereby secure the conveyor ball unit in position.

That design configuration therefore involves a minimum number of individual components so that not only is it possible to meet the requirement for minimum weight, but in addition, because of the simplicity of the structure used, the arrangement also ensures a high degree of reliability in use and inexpensive manufacturing.

A particularly preferred embodiment of the invention provides that the locking elements each include an elastic portion which is of an upwardly open U-shape and of which a vertical limb is fixedly connected to the ball guide means while its other vertical limb is remote from the conveyor ball is elastically tiltable relative to the vertical and, at a spacing from its free upper end, carries the locking shoulder which projects outwardly away from the conveyor ball.

A particularly advantageous construction is one in which the locking elements are formed in one piece with the ball guide means. In that case the ball guide means and the locking elements may be for example in the form of a shaped plastic member, thereby taking account of the requirement for the unit to be of a low weight.

It is preferably provided that, in the assembled condition of the conveyor ball unit, the locking elements project downwardly through openings in the mounting shell and in so doing respectively engage with their locking shoulders under a rim or flange portion which forms the upper edge of the openings, wherein each locking shoulder projects outwardly away from the conveyor ball beyond the rim or flange portion and engages under the peripheral edge of the mounting opening in the conveyor track panel.

A particularly preferred construction according to the invention is one in which the outer vertical limb of the locking elements can be elastically deflected towards the conveyor ball to such an extent that the locking shoulder selectively only comes out from under the peripheral edge of the base opening or also releases the rim or flange portion of the mounting shell. If, with that construction, the free end of the outer vertical limb is firstly elastically deflected slightly towards the conveyor ball, the locking shoulder comes out from under the peripheral edge of the mounting opening so that the conveyor ball unit can be removed upwardly from the conveyor track panel. In that condition however the locking shoulder is still in a securing position beneath the rim or flange portion of the mounting shell so that the conveyor ball unit is still being held together as a complete unit. It is only when the outer vertical limb is further deflected towards the conveyor ball that the locking shoulder also moves out from under the rim or flange portion so that the ball guide means can be lifted upwardly off the mounting shell. It will be appreciated that that is required only if the conveyor ball unit is to be dismantled, for example to replace components thereof or for cleaning purposes.

Further objects, features and advantages of the invention will be apparent hereinafter in a description of a preferred embodiment.

DESCRIPTION OF THE PREFERRED EMBODIMENT

Figure 1:
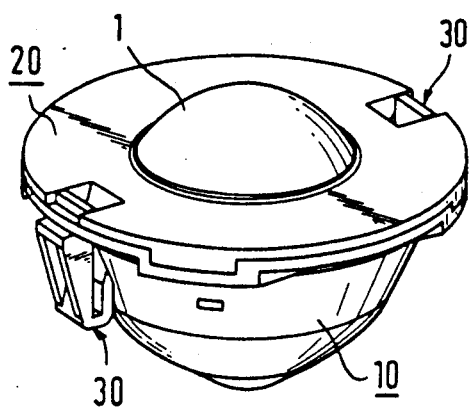
FIG. 1 shows a perspective view of the assembled conveyor ball unit.
Figure 2:
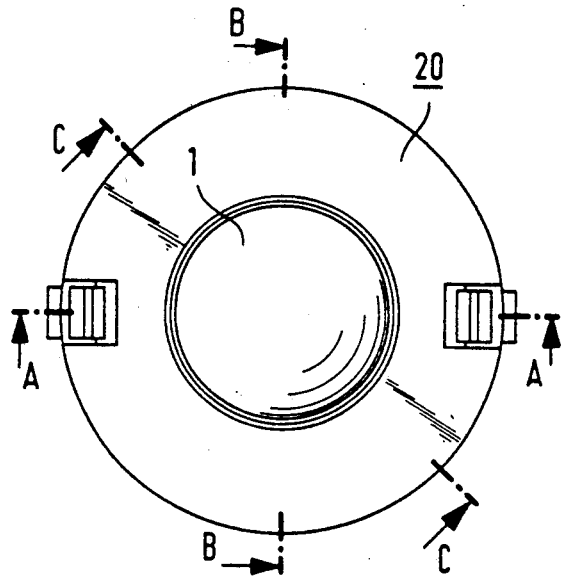
FIG. 2 is a plan view of the conveyor ball unit shown in FIG. 1.
Figure 3:
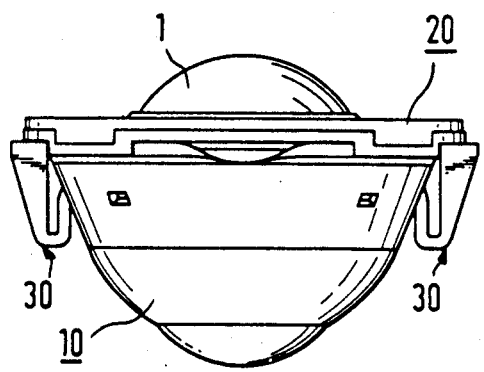
FIG. 3 is a side view of the conveyor ball unit, as viewed from below in FIG. 2 of the drawing.
Figure 4:
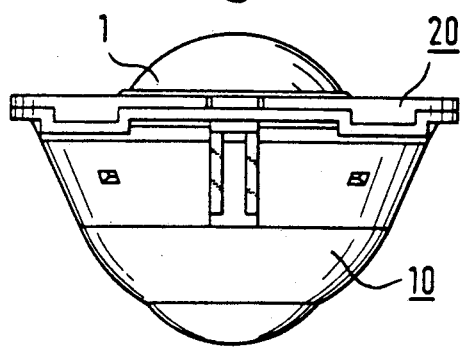
FIG. 4 is a further side view of the conveyor ball unit, viewed from the left in FIG. 2 of the drawing.

Referring now more particularly to FIGS. 1 through 4 and 8 through 10, a conveyor ball unit comprises a substantially hemispherical mounting shell 10 (see FIG. 5) in which a plurality of mounting balls 15 is arranged in a layer of juxtaposed balls, the layer of balls covering the inside surface of the mounting shell 10. A conveyor ball 1 is rotatably mounted on the mounting balls 15. The conveyor ball 1 is surrounded from above by a substantially annular ball guide means 20, as shown in FIG. 6, having a central opening 22 through which the upper portion of the conveyor ball 1 projects upwardly beyond the surface of a conveyor track panel 90, in the manner shown in FIGS. 8 through 10.

Formed on the upper edge of the central opening 22 of the ball guide means 20 is a sealing lip 21 which bears sealingly slidably against the conveyor ball 1. The remaining part of the opening 22 provides a clearance with respect to the conveyor ball 1.

Figure 8:
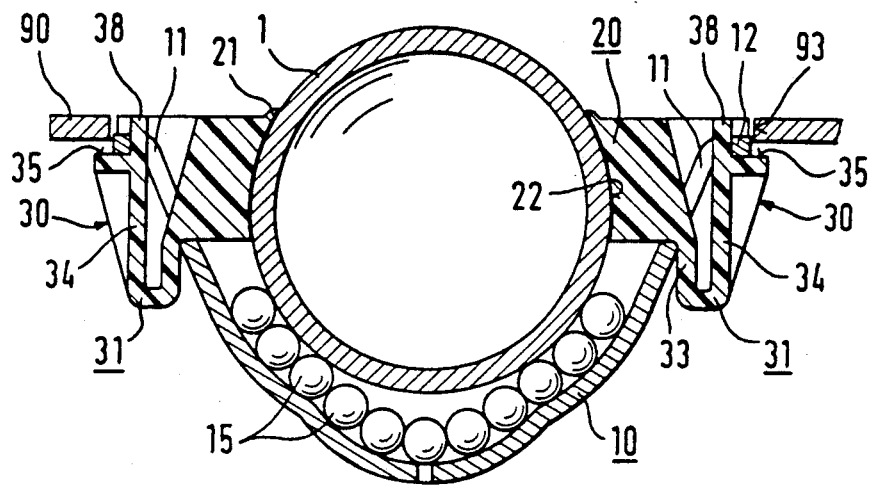
FIG. 8 is a view in vertical section of the assembled conveyor ball unit, taken along line A—A in FIG. 2.
Figure 9:
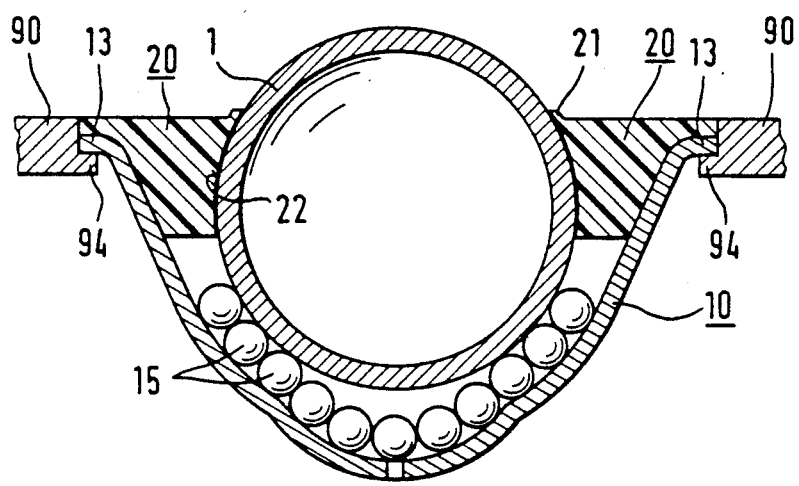
FIG. 9 is a view in vertical section of the conveyor ball unit taken along line B—B in FIG. 2.
Figure 10:
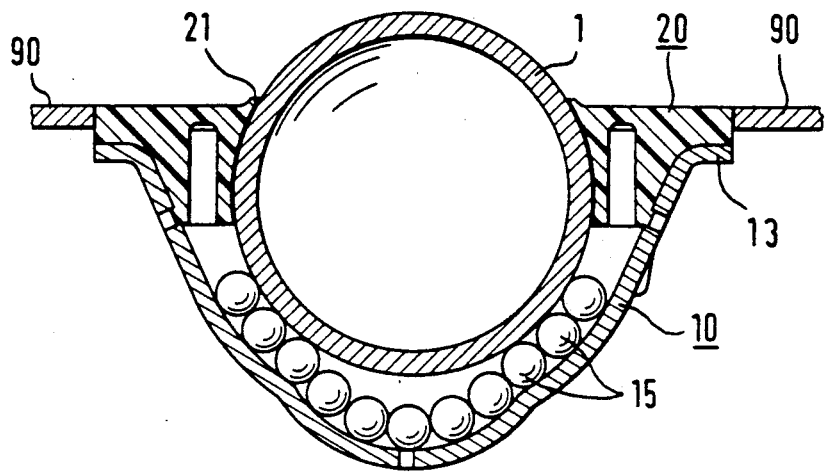
FIG. 10 is a view in vertical section of the conveyor ball unit taken along line C—C in FIG. 2.

As can best be seen from FIGS. 8 through 10, the mounting shell 10 is not a precise hemisphere but is shaped with different radii of curvature in such a way that the conveyor ball 1 is only supported in an annular region on the mounting balls 15.

Figure 7:
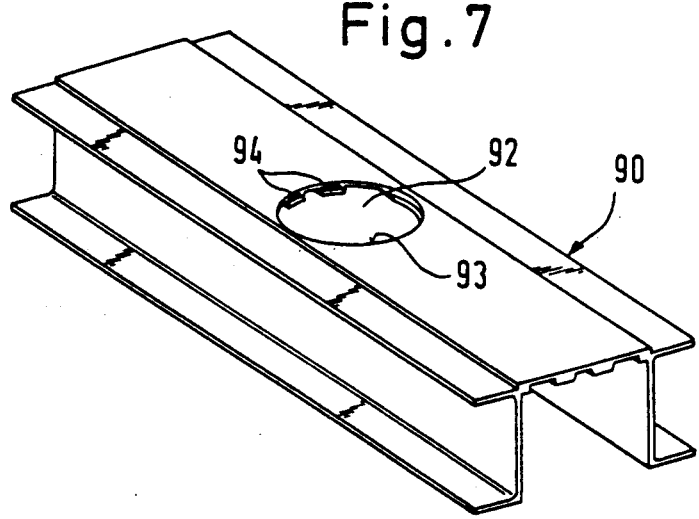
FIG. 7 is a perspective view of a portion of a conveyor track panel with the mounting opening provided therein.
Figure 5:
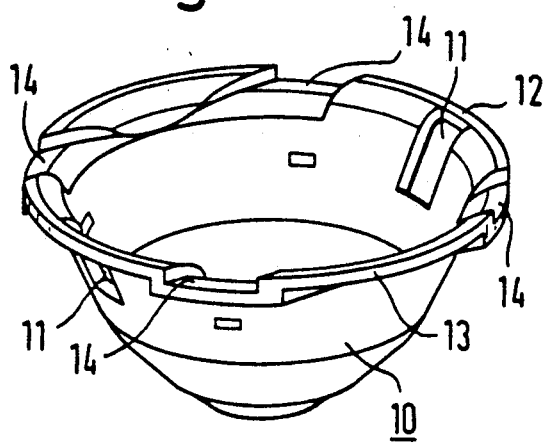
FIG. 5 is a perspective view of the mounting shell.
Figure 6:
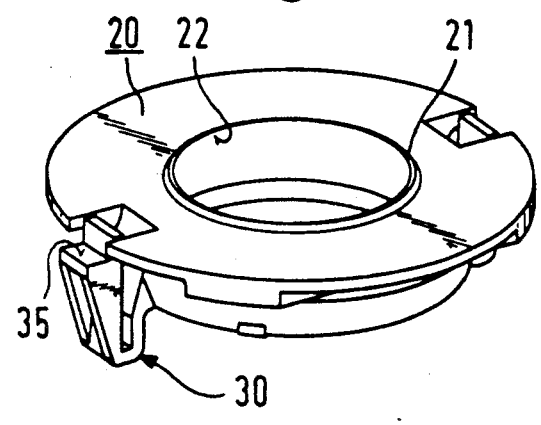
FIG. 6 is a perspective view of the ball guide means.

As can best be seen from FIG. 5, the upper edge of the mounting shell 10 is shaped to provide channels 14 which extend along chords of a circle at a spacing from the centre line and which are adapted to the mounting openings 92 in the conveyor track panel 90 shown in FIG. 7, and which serve to prevent the conveyor ball unit from rotating in the assembled condition of being mounted in the conveyor track panel 90.

In addition at its upper periphery the mounting shell 10 is shaped to provide a substantially horizontal peripheral flange 13 which serves to support the unit at the corresponding mounting segments 94 of the mounting opening 92 in the conveyor track panel 90.

Finally the mounting shell 10 is also provided with two diametrally oppositely disposed rectangular openings 11 adjacent the upper peripheral edge thereof. The upper edges of the rectangular openings 11 are each delimited by a flange or rim portion 12 which is a part of the peripheral flange 13 of the mounting shell 10.

As FIGS. 6 and 8 particularly show, the ball guide means is provided with a respective locking element 30 at each of two diametrically oppositely disposed regions thereof. Each of the locking elements 30 includes an upwardly open U-shaped spring portion 31 having an inner vertical limb 33 which is integrally connected to the remainder of the ball guide means 20. The outer vertical limb 34 which extends upwardly at a small spacing from the inner limb 33 carries a radially outwardly projecting locking shoulder 35, adjacent the upper free end 38 of the vertical limb 34. The spacing of the outer limb 34 from the inner limb 33 is so selected that, when a pressure is applied to the free end 38 of the elastically deflectable outer limb 34, the outer limb 34 can move towards the centre of the ball guide means 20 to such an extent that the locking shoulder 35 can move inwardly at least by a distance corresponding to its radial width (as viewed in relation to the centre point of the ball guide means 20).

Preferably the ball guide means 20, together with the locking element 30, is made in one piece in the form of a shaped component of resilient plastic material, while the mounting shell 10, the mounting ball 15 and also the conveyor ball 1 are usually made from metal.

As shown in particular in FIG. 8, in the assembled condition of the conveyor ball unit, the U-shaped spring portions 31 of the locking elements 30 engage downwardly through the rectangular openings 11 in the mounting shell 10, in which case in particular the locking shoulder 35 of each locking element engages under the rim or flange portion 12 of the respective opening 11 so that the conveyor ball unit consisting of the conveyor ball 1, the mounting shell 10, the mounting balls 15 and the ball guide means 20 is held together as a unit.

However, the locking shoulders 35 are of such a radial width that they project outwardly beneath the respective rim or flange portion 12 and engage under the peripheral edge 93 of the associated mounting opening 92 in a conveyor track panel 90.

In that condition therefore the conveyor ball unit is held in position in a downward direction by the mounting segments 94 (see FIGS. 7 and 9) while it is supported by the outer ends of the locking shoulders 35 against the underside of the peripheral edge 93 of the mounting opening 92 in the conveyor track panel 90 and as a result cannot move out in an upward direction.

Figure 11:
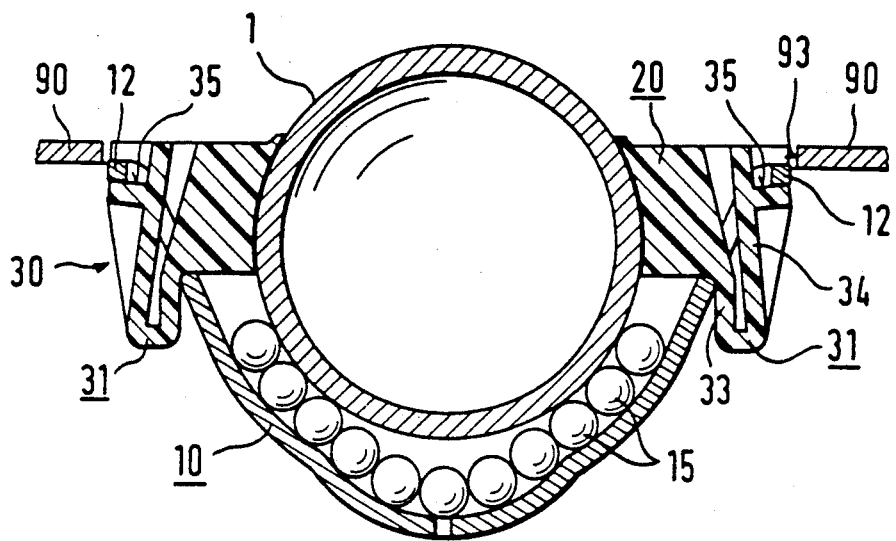
FIG. 11 is a view in vertical section, corresponding to that shown in FIG. 8, of the conveyor ball unit, wherein the locking elements are partially released for removal of the conveyor ball unit from the conveyor track panel.

For the purposes of removing the conveyor ball unit from the conveyor track panel 90, a force which is directed towards the conveyor ball 1 is applied by means of a suitable tool to the free end 38 of each of the locking elements 30 until the outer vertical limbs 34 are moved resiliently inwardly towards the conveyor ball 1 to such an extent that the respective locking shoulder 35 comes out from under the peripheral edge 93 of the conveyor track panel 90. That condition which is shown in FIG. 11 permits the conveyor ball unit to be removed from the mounting opening 92 in an upward direction. In that condition nonetheless the conveyor ball unit is still guaranteed to be securely held together as a unit as the locking shoulder 35 still engages under the rim or flange portion 12 of the mounting shell 10.

If the conveyor ball unit is to be dismantled, the free ends 38 of the outer vertical limbs 34 are resiliently bent still further inwardly towards the conveyor ball 1 until the outer ends of the locking shoulders 35 come out from under the rim or flange portions 12 so that the ball guide means 20 can be removed from the mounting shell 10 in an upward direction. That condition is shown in FIG. 12.

Figure 12:
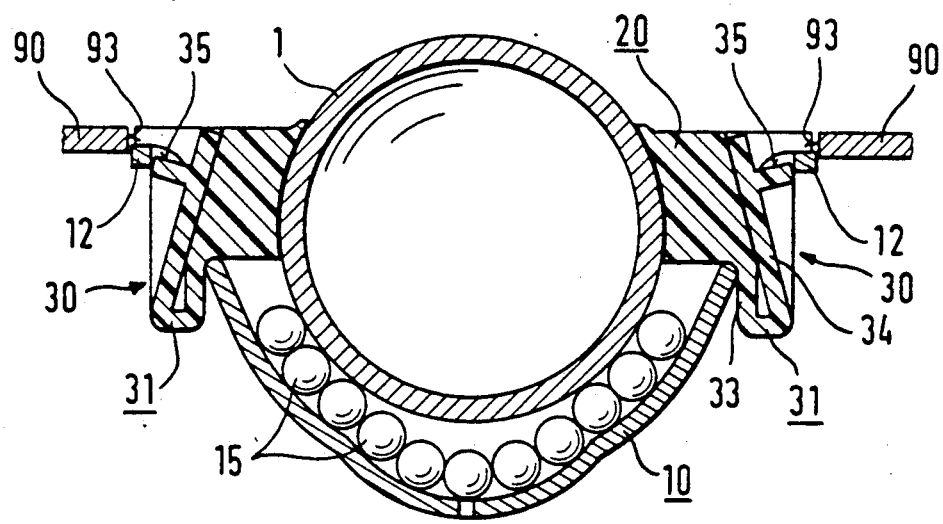
FIG. 12 is a view corresponding to that shown in FIG. 11, but in which the locking elements have been resiliently moved entirely inwardly so that the ball guide means is removable from the mounting shell in an upward direction.

It will be appreciated that the condition of deformation of the locking element 30, which is shown in FIG. 12, is also used for assembly of the conveyor ball unit.

Therefore, the above-described locking elements 30 perform the dual function of locking the ball guide means 20 to the mounting shell 10 on the one hand and locking the entire conveyor ball unit in the mounting opening 92 in a conveyor track panel 90, on the other hand.

It will be appreciated that the above-described constructions have been set forth solely by way of example and illustration of the invention and that various modifications and alterations may be made therein without thereby departing from the spirit and scope of the invention.

What is claimed is:

1. A conveyor ball unit for installation in a mounting opening (92) in a conveyor track panel (90), comprising a mounting shell (10) having a peripheral flange (13), a plurality of mounting balls (15) in the mounting shell (10), a conveyor ball (1) rotatably mounted on the mounting balls and projecting upwardly out of the conveyor ball unit, and a ball guide means (20) embracing the conveyor ball (1) from above in an annular configuration and operable to retain the conveyor ball (1) and the mounting balls (15) in the mounting shell (10), the ball guide means (20) having a peripheral edge portion with at least two locking elements (30) each having a locking shoulder (35) adapted in the assembled condition of the unit to engage securingly under said peripheral flange (13) on the mounting shell 10, the mounting shell (10) having openings (11) adapted to permit said locking shoulders (35) to engage under the peripheral flange (13), wherein in the installed condition of the unit the peripheral flange (13) of the mounting shell (10) is supported against a peripheral edge portion (93) of the mounting opening (92) in the conveyor track panel (90), and wherein the locking shoulders (35) of the locking elements (30) have free outer ends securingly engaging under said peripheral edge portion (93) of the mounting opening (92).

2. A conveyor ball unit as set forth in claim 1 wherein the locking elements (30) each include an upwardly open U-shaped resilient spring portion (31) having a first at least substantially vertical limb (33) fixedly connected to the ball guide means (20) and a second at least substantially vertical limb (34) which is remote from the conveyor ball (1) and is elastically pivotable with respect to the vertical, the second limb (34) at a spacing from its free upper end carrying the respective locking shoulder (35) which projects outwardly away from the conveyor ball (1).

3. A conveyor ball unit as set forth in claim 1 wherein the locking elements (30) are formed integrally with the ball guide means (20).

4. A conveyor ball unit as set forth in claim 1 wherein the mounting shell (10) has at least two said openings (11) adapted to receive respective ones of said locking elements (30) and said mounting shell (10) has an edge flange portion (12) which forms the upper edge of said openings (11), and wherein in the assembled condition of the conveyor ball unit the locking elements (30) project downwardly through said openings (11) in the mounting shell (10) and in so doing engage with their respective locking shoulder (35) under said flange portion (12) of the mounting shell (10), and wherein each locking shoulder (35) projects outwardly away from the conveyor ball (1) beyond said flange portion (12) and engages under the peripheral edge portion (93) of the mounting opening (92) in the conveyor track panel portion (90).

5. A conveyor ball unit as set forth in claim 4 wherein said second limb (34) of each locking element (30) is adapted to be resiliently deflected towards the conveyor ball (1) to such an extent that the locking shoulder (35) thereof selectively only comes out from under the peripheral edge portion (93) of the mounting opening (92) or also releases said flange portion (12) of the mounting shell (10).

6. In a conveyor track arrangement having a panel portion (90) comprising a mounting opening (92) with a peripheral edge portion (93), a conveyor ball unit comprising a mounting shell (10) having an outwardly extending peripheral flange (13), a plurality of mounting balls (15) accommodated in the mounting shell (10), a conveyor ball (1) rotatably supported on the mounting balls (15) in the mounting shell (10), with a portion of the conveyor ball (1) projecting upwardly out of the mounting shell (10), and a ball retainer (20) of annular configuration disposed on the mounting shell (10) around the conveyor ball (1) and operable to retain the conveyor ball (1) rotatably on the mounting balls (15) in the mounting shell (10), the ball retainer (20) having a peripheral edge portion with at least two locking elements (30) each having a locking shoulder (35) projecting outwardly therefrom to a free outer end portion, the mounting shell (10) having openings (11) adapted to permit said locking shoulders (35) to engage under the peripheral flange (13), wherein the assembled condition of the unit the locking shoulders (35) securingly under said peripheral flange (13) on the mounting shell (10) to hold the ball retainer (20) to the mounting shell (10) and wherein in the installed condition of the unit in the opening (92) in the panel portion (90) the peripheral flange (13) of the mounting shell (10) is supported against the peripheral edge portion (93) of the mounting opening (92), and the free outer end portions of the locking shoulders (35) securingly engage under said peripheral edge portion (93) to retain the unit to said panel portion (90).

* * * * *